United States Patent [19]

Dankowych

[11] Patent Number: 4,960,319
[45] Date of Patent: Oct. 2, 1990

[54] ACTIVE POLARIZATION CONTROL SERVO AND METHOD

[75] Inventor: John A. Dankowych, Toronto, Canada

[73] Assignee: Litton Systems, Inc., Beverly Hills, Calif.

[21] Appl. No.: 417,182

[22] Filed: Oct. 4, 1989

[51] Int. Cl.[5] ............... G02B 6/02; G02B 6/16; G02B 6/26

[52] U.S. Cl. .................. 350/96.29; 350/96.15

[58] Field of Search .......... 350/96.15, 96.20, 96.21, 350/96.16, 96.29, 96.30

[56] References Cited

U.S. PATENT DOCUMENTS

| | | | |
|---|---|---|---|
| 4,386,822 | 6/1983 | Bergh | 350/96.15 |
| 4,389,090 | 6/1983 | LeFevre | 350/96.29 |
| 4,666,235 | 5/1987 | Pavlath | 350/96.15 |
| 4,695,123 | 9/1987 | Chang et al. | 350/96.15 |
| 4,725,113 | 2/1988 | Chang et al. | 350/96.15 |
| 4,729,622 | 3/1988 | Pavlath | 350/96.15 |
| 4,753,507 | 6/1988 | DePaula et al. | 350/96.15 |

OTHER PUBLICATIONS

Simon et al., "Evolution of Polarization Along a Single-Mode Fiber", Applied Physics Letters, Oct. 1977, vol. 31, No. 8, pp. 517-520.

Ulrich et al., "Polarization Optics of Twisted Single-Mode Fibers", Applied Optics, Jul. 1979, vol. 18, No. 13, pp. 2241-1151.

Johnson, "In-Line Fiber-Optical Polarization Transformer", Applied Optics, May 1979, vol. 18, No. 9, pp. 1288-1289.

Ulrich et al., "Single-Mode Fiber Optical Polarization Rotator", Applied Optics, Jun. 1979, vol. 18, No. 11, pp. 1857-1861.

Ulrich et al., "Fiber-Ringinterferometer: Polarization Analysis", Optics Letters, May 1979, vol. 4, No. 5, pp. 152-154.

Kubota et al., "Electro-Optical Polarisation Control on Single-Mode Fibres", Electronics Letters, Jul. 1980, vol. 16, No. 15, p. 573.

Ulrich, "Fiber-Optic Rotation Sensing with Low Drift", Optics Letters, May 1980, vol. 5, No. 5, pp. 173-175.

Ulrich et al., "Bending Induced Birefringence in Single Mode Fibers", Optics Letters, Jun. 1980, vol. 5, No. 6, pp. 273-275.

LeFevre, "Single Mode Fibre Fractional Wave Devices and Polarization Controllers", Electronics Letters, Sep. 1980, vol. 16, No. 20, pp. 778-780.

Kintner, "Polarization Control in Optical-Fiber Gyroscopes", Optics Letters, Mar. 1981, vol. 6, No. 3, pp. 154-156.

(List continued on next page.)

*Primary Examiner*—William L. Sikes
*Assistant Examiner*—Akm E. Ullah
*Attorney, Agent, or Firm*—Lynn & Lynn

[57] ABSTRACT

An active polarization control system, which provided two dimensional optical waveguide birefringence modulation, provides polarization control in systems such as fiber optic rotation sensors and coherent fiber optic communications systems without the necessity of using costly polarization preserving fiber. In a rotation sensor, the signal output from the sensing loop is used to form feedback signals for correcting polarization state errors. The feedback signals are used to provide the corrective voltage applied to two banks of orthogonally modulated birefringence transducers situated inside the rotation sensing loop. In a coherent fiber optic communications system orthogonal modulation of two banks of birefringence transducers situated in either the communications or local oscillator signal arms at the receiver provides the required feedback signals for polarization control. The polarization of light guided by an optical waveguide is controlled by adjusting the birefringence of the opticla waveguide with a first transducer and a second transducer arranged to act on the optical waveguide along parallel axes and a third transducer being on an axis that is placed between the parallel axes and angularly displaced by 45° therefrom. A first control signal is applied to each of the first and second transducers, and a second control signal in time quadrature with the first control signal is applied to the third transducer.

28 Claims, 5 Drawing Sheets

OTHER PUBLICATIONS

Pavlath et al., "Birefringence and Polarization Effects in Fiber Gyroscopes", Applied Optics, May 1982, vol. 21, No. 10, pp. 1752–1757.

Reinhart et al., "Electronic Polarization Modulation in Multielectrode AlxGa1-x As Rib Waveguides", Apr. 1982, vol. QE-18, No. 4, pp. 763–766.

Mohr et al., "Polarization Control for an Optical Fiber Gyroscope", Nov. 9–11, 1981, Summer, Fiber Optic Rotation Sensors and Related Technologies, Ed. S. Ezekial & H. J. Ardity, Springer Series in Optical Sciences, 1982, vol. 32, pp. 163–168.

Giese et al., "Single-Loop Polarization Stabilization for Single-Mode Fiber", Optics Letters, Jul. 1982, vol. 7, No. 7, pp. 337–338.

Stowe, "Polarization Fading in Fiber Interferometric Sensors", IEEE Journal of Quantum Electronics, Oct. 1982, vol. 10, No. 10, pp. 1644–1646.

Alferness et al., "High-Speed Waveguides Electro-Optic Polarization Modulator", Optics Letters, Oct. 1982, vol. 7, No. 10, pp. 500–502.

Heismann et al., "Integrated-Optical Single-Sideband Modulator and Phase Shifter", IEEE Journal of Electronics, Apr. 1982, vol. QE-18, No. 4, pp. 767–771.

Rashleigh, "Origins and Control of Polarization Effects in Single-Mode Fibers", Journal of Lightwave Technology, Jun. 1983, vol. LT-1, No. 2, pp. 312–331.

Bergh et al., "An Overview of Fiber-Optic Gyroscopes", Journal of Lightwave Technology, Apr. 1984, vol. LT-2, No. 2, pp. 91–107.

Imai et al., "Optical Polarisation Control Utilising an Optical Heterodyne Detection Scheme", Electronics Letters, Jan. 1985, vol. 21, No. 2, pp. 52–53.

Mariller et al., "A Simple and Wide Optical Bandwidth TE/TM Converter Using Z Propagating LiNbO3 Waveguides", May 6–8 1985, Proceedings 3rd European Conference on Integrated Optics, ECIO'85, Berlin, pp. 174–176.

Okashi, "Polarization-State Control Schemes for Heterodyne or Homodyne Optical Fiber Communications", Journal of Lightwave Technology, Dec. 1985, vol. LT-3, No. 6, pp. 1232–1237.

Rysdale, "Method of Overcoming Finite-Range Limitation of Certain State of Polarisation Control Devices in Automatic Polarization Control Schemes", Electronics Letters, Jan. 1986, vol. 22, No. 2, pp. 100–102.

Matsumoto et al., "Endless Rotatable Fractional-Wave Devices for Single-Mode Fibre Optics", Electronics Letters, Jan. 1986, vol. 22, No. 2, pp. 78–79.

Noda et al., "Polarization-Maintaining Fibers and Their Applications", Journal of Lightwave Technology, Aug. 1986, vol. LT-4, No. 8, pp. 1071–1089.

Okashi, "Ultimate Performance of Heterodyne/Coherent Optical Fiber Communications", Journal of Lightwave Technology, Oct. 1986, vol. LT-4, No. 10, pp. 1556–1562.

Noe, "Endless Polarisation Control in Coherent Optical Communications", Electronics Letters, Jul. 1986, vol. 22, No. 15, pp. 772–773.

Tatam et al., "All-Fiber-Optic Polarization State Azimuth Control: Application of Faraday Rotation", Journal of Lightwave Technology, Jul. 1988, vol. 6, No. 7, pp. 1171–1176.

Honmou et al., "Stabilisation of Heterodyne Receiver Sensitivity with Automatic Polarisation Control System", Electronics Letters, Oct. 1986, vol. 22, No. 22, pp. 1181–1182.

Noe, "Endless Polarisation Control Experiment with Three Elements of Limited Birefringence Range", Electronics Letters, Dec. 1986, vol. 22, No. 25, pp. 1341–1343.

Thaniyavarn, "Wavelength Independent, Optical-Damage-Immune LiNbO3 TE-TM Mode Converter", Optics Letters, vol. 11, No. 1, pp. 39–41.

Carrara et al., "Bias Drift Reduction in Polarization-Maintaining Fiber Gyroscope", Optics Letters, Mar. 1987, vol. 12, No. 3, pp. 214–216.

Tatam et al., "Full Polarization State Control Utilizing Linearly Birefringent Monomode Optical Fiber", Journal of Lightwave Technology, Jul. 1987, vol. LT-5, No. 7, pp. 980–985.

Heidrich et al., "Polarisation Transformer on Ti:LiNbO3 with Reset-Free Optical Operation for Heterodyne/Homodyne Receivers", Electronics Letters, Mar. 1987, vol. 23, No. 7, pp. 335–336.

Walker et al., "Endless Polarisation Control Using Four Fibre Squeezers", Electronics Letters, Mar. 1987, vol. 23, No. 6, pp. 290–292.

Vatarescu, "Polarisation State Stabilisation in Optically Nonlinear Birefringent Fibres", Electronics Letters, Apr. 1987, vol. 23, No. 8, pp. 379–380.

(List continued on next page.)

OTHER PUBLICATIONS

Noe et al., "Endless Polarisation Control Systems for Coherent Optics", Journal of Lightwave Technology, Jul. 1988, vol. 6, No. 7, pp. 1199–1208.

Mahon et al., "Endless Polarisation State Matching Control Experiment Using Two Controllers of Finite Control Range", Electronics Letters, Nov. 1987, vol. 23, No. 23, pp. 1234–1235.

Kersey et al., "Dependence of Visibility on Input Polariztion in Interferometric Sensors", Optics Letters, Apr. 1988, vol. 13, No. 4, pp. 288–290.

Walker et al., "Lithium Niobate Waveguide Polarisation Convertor", Electronics Letters, Jan. 1988, vol. 24, No. 2, pp. 103–105.

Noe, "Automatic Endless Polarisation Control with Integrated-Optical Ti:LiNbO$_3$ Polarisation Transformers", Jun. 1988, Optics Letters, vol. 13, No. 6, pp. 527–529.

Pannell et al., "Monomode Fiber Modulators Frequency and Polarization State Control", Fiber and Integrated Optics, vol. 7, pp. 299–315.

Creaner et al., "565 Mbits/s Optical PSK Transmission System with Endless Polarisation Control", Mar. 1988, Electronics Letters, vol. 24, No. 5, pp. 270–271.

Walker et al., "Endless Polarisation Control Using an Integrated Optic Lithium Niobate Device", Electronics Lettes, Mar. 1988, vol. 24, No. 5, pp. 266–268.

Wanser et al., "Remote Polarization Control for Fiber-Optic Interferometers", Optics Letters, vol. 12, No. 3, pp. 217–219.

Shimizu et al., "Endless Polarisation Controller Using Electro-Optic Waveplates", Electronic Letters, Mar. 1988, vol. 24, No. 7, pp. 412–413.

Kersey et al., "Optimization and Stabilization of Visibility in Interferometric Fiber-Optic Sensors Using Input-Polarization Control", Journal of Lightwave Technology, Oct. 1988, vol. 6, No. 10, pp. 1599–1609.

Arie et al., "The Effects of Polarization Control on the Transfer Function and the Phase Induced Noise of a Fiber-Optic Recirculating Delay Line", Journal of Lightwave Technology, Oct. 1988, vol. 6, No. 10, pp. 1566–1574.

Linke, "High-Capacity Coherent Lightwave Systems", Journal of Lightwave Technology, Nov. 1988, vol. 6, No. 11, pp. 1750–1769.

Walker et al., "Rugged All-Fiber Endless Polarisation Controller", Electronics Letters, Oct. 1988, vol. 24, No. 22, pp. 1363–1354.

Barnes, "2×2 Optical Fibre Polarization Switch and Polarisation Controller", Electronics Letters, Nov. 1988, vol. 24, No. 23, pp. 1427–1429.

Bulmer et al., "Interrogation of an Integrared Optical Modulator Over a Low-Birefringence Fiber Using Polarization Tracking", IEEE Photonics Technology Letters, Feb. 1989, vol. 1 No. 2 pp. 35–37. 738.

Namihira et al. Dynamic Polarisation Fluctuation Characteristics of Optical Fibre Submarine Cables under Various Environmental Conditions, Journal of Lightwave Technology, May 1988, vol. 6, No. 5, pp. 728–738.

Wetherell, "Polarization Matching Mixer in Coherent Optical Communications Systems", Optical Engineering, Feb. 1989, vol. 28, No. 2, pp. 148–156.

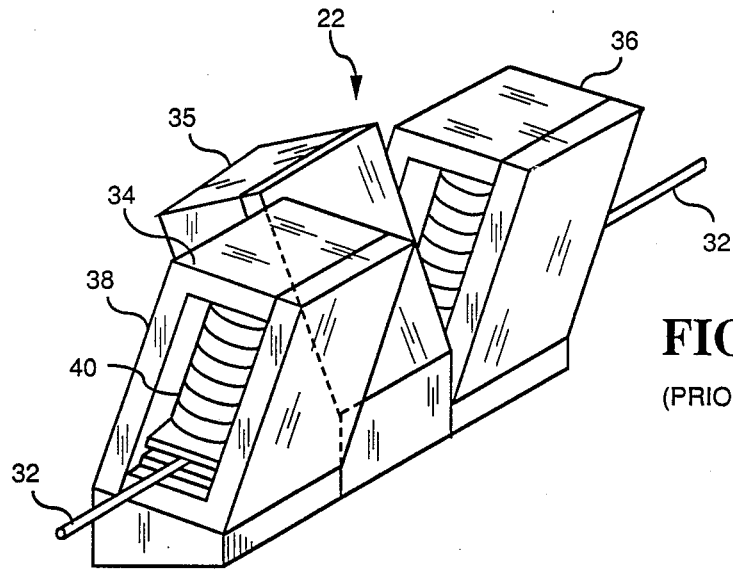
FIG. 8
(PRIOR ART)
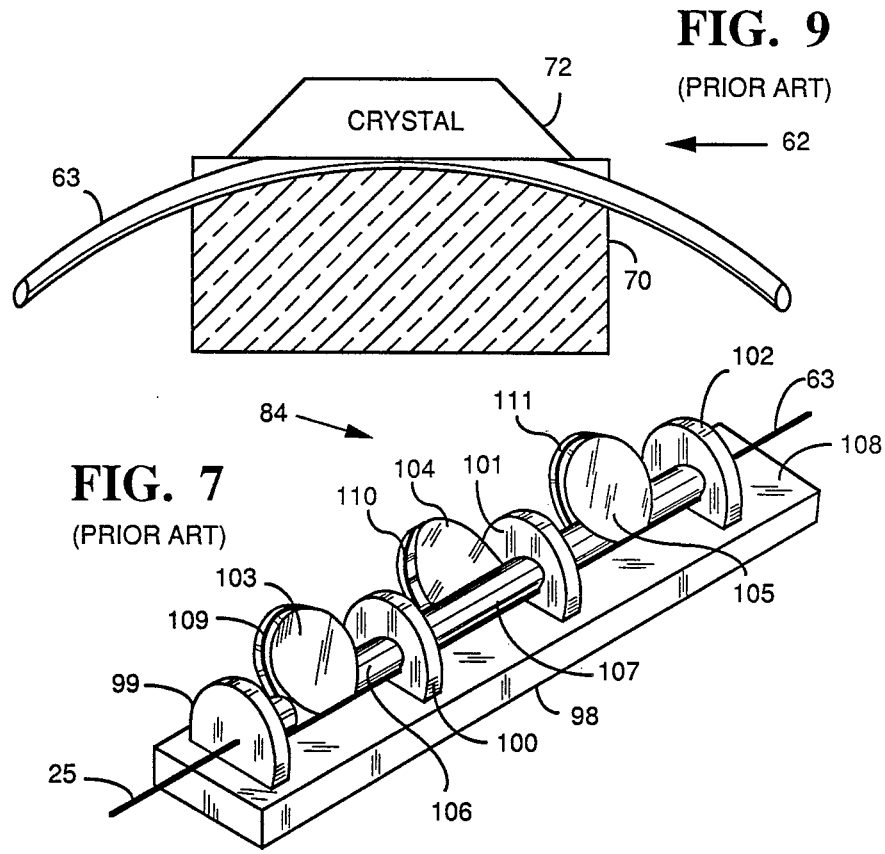
FIG. 9
(PRIOR ART)
FIG. 7
(PRIOR ART)

ACTIVE POLARIZATION CONTROL SERVO AND METHOD

BACKGROUND OF THE INVENTION

This invention relates generally to apparatus and methods for controlling the polarization of light. This invention relates particularly to apparatus and methods for controlling the polarization of light propagating in an optical fiber. Still more particularly, this invention relates to apparatus and methods for controlling the polarization of light in fiber optic rotation sensing systems and in coherent communications systems.

A fiber optic ring interferometer typically comprises a loop of fiber optic material having counter-propagating light waves therein. After traversing the loop, the counter-propagating waves are combined so that they constructively or destructively interfere to form an optical output signal. The intensity of the opitcal output signal varies as a function of the interference, which is dependent upon the relative phase of the counter-propagating waves.

Fiber optic ring interferometers have proven to be particularly useful for rotation sensing. Rotation of the loop creates a relative or non-reciprocal phase difference between the counter-propagating waves, in accordance with the well known Sagnac effect, with the amount of phase difference being a function of the angular velocity of the loop about its sensing axis. The optical output signal produced by the interference of the counter-propagating waves varies in intensity as a function of the rotation rate of the loop. Rotation sensing is accomplished by detecting the optical output signal and processing the optical output signal to determine the rotation rate.

Some familiarity with polarization of light and propagation of light within an optical waveguiding structure will facilitate an understanding of the present invention. It is well-known that a light wave may be represented by a time-varying electromagnetic field comprising orthogonal electric and magnetic field vectors having a frequency equal to the frequency of the light wave.

An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the guiding structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only field having certain frequencies and spatial distributions will propagate without severe attenuation. The waves having field components that propagate unattenuated are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. The direction of the electric field vector in an electromagnetic wave is the polarization of the wave. In general, a wave will have random polarization in which there is a uniform distribution of electric field vectors pointing in all directions permissible for a given mode. If all the electric field in a wave points in only a particular direction, the wave is linearly polarized. If the electric field consists of two orthogonal electric field components of equal magnitude, the electric field is circularly polarized because the net electric field is a vector that rotates around the optic axis at an angular velocity equal to the frequency of the wave. If the two linear polarizations are unequal, the wave has elliptical polarization. In general, any arbitrary polarization can be represented by the sum of two orthogonal linear polarizations, two oppositely directed circular polarizations or two counter rotating elliptical polarizations that have orthogonal major axes.

The boundary between the core and cladding of an optical fiber is a dielectric interface at which certain well-known boundary conditions on the field components must be satisfied. For example, the component of the electric field perpendicular to the interface must be continuous. A single mode optical fiber propagates electromagnetic energy having an electric field component perpendicular to the core-cladding interface. Since the fiber core has an index of refraction greater than that of the cladding and light impinges upon the interface at angles greater than or equal to the critical angle, essentially all of the electric field remains in the core by internal reflection at the interface. To satisfy both the continuity and internal reflection requirements, the radial electric field component in the cladding must be a rapidly decaying exponential function. The exponentially decaying field is usually called the "evanescent field."

The velocity of an optical signal depends upon the index of refraction of the medium through which the light propagates. Certain materials have different refractive indices for different polarizations. A material that has two refractive indices is said to be birefringent. A standard single mode optical fiber may be regarded as a two mode fiber because it will propagate two waves of the same frequency and spatial distribution that have two different polarizations. Two different polarization components of the same normal mode can propagate through a briefringent material unchanged except for a velocity difference between the two polarizations.

It is well known that in many fiber optic systems it may be desirable to have light of a known polarization state at selected points for input to components whose operation is polarization dependent in order to minimize errors. The state of polarization is particularly important in a device such as a fiber optic rotation sensor. In a polarized optical fiber rotation sensing system, drift errors due to changes in polarization are determined by the quality of the polarizer.

The polarization state of light propagating in single mode optical fiber is not stable with time or distance along the fiber. In a fiber fiber optic rotation sensor that includes a polarizer, a preferred polarization state is defined at the location of the polarizer before the optical signal is split to form the counterpropagating waves that are input to the sensing loop. The two counter-propagating waves returning from the sensing loop to the polarizer must have polarization states that match the originally defined polarization state.

However, the birefringence of normal optical fiber will in general cause a polarization mismatch between the input and output waves. This polarization mismatch will result in several undesirable conditions, the most important of which include reduced signal strength and increased parasitic non-reciprocal signal at the detector. Furthermore, the birefringence of the fiber changes with time, for example due to temperature changes, acoustic fluctuations, mechanical deformations such as bending, twisting, squeezing or kinking of the fiber, and magnetic field fluctuations. The resulting time dependent polarization mismatch leads to an unstable signal strength and drift of the non-reciprocal signal component, which is used to indicate the rotation rate. Both the static and time dependent effects of mismatch in the polarization state degrade the performance of the fiber optic rotation sensor.

A linear polarization state in an optical fiber is typically achieved with some type of linear polarizer such as the fiber optic polarizer described in U.S. Pat. No. 4,386,822 to Bergh. The polarization state input to the polarizer is arbitrary in general. The polarizer couples light of undesired polarizations out of the fiber and permits light having only a selected desired polarization to propagate through the fiber. Bergh discloses a fiber optic polarizer including a length of optical fiber mounted in a curved groove in a quartz substrate. The substrate and a portion of the optical fiber are ground and polished to remove a portion of the cladding from the fiber to form an interaction region. The portion of the fiber in the groove is convexly curved as viewed looking toward the polished surface. The birefringent crystal is mounted on the substrate over the interaction region in close proximity to the core of the fiber optic material. The crystal is positioned to partially intersect the path of light propagating in the core of the optical fiber so that evanescent field coupling couples light of undesired polarizations from the optical fiber into the crystal.

In previous systems for active polarization control in fiber optic rotation sensors it has been necessary to utilize polarizers that pass light having the desired polarization while rejecting unwanted polarization components in a direction non-collinear with the output fiber. In such systems the desired polarization state is maintained by adjusting the birefringence of the fiber through a polarization control device to a state that minimizes the intensity of the ejected non-collinear output. To maintain the required polarization state, a compensating birefringence effect must be induced in the sensing loop of the fiber optic rotation sensor. This prior technique requires a complex polarizer, extra photodetection equipment and complex electronic control circuitry for providing the required feedback signals.

Polarization control is also utilized in coherent fiber optic communications systems in which the carrier signal is derived from a long coherence length solid state laser. The signal is transmitted as a modulation applied as amplitude, frequency or phase variations in the optical carrier. In an optical heterodyne receiver, the light from the transmission fiber and the light from a local oscillator laser are mixed to generate an intermediate frequency that typically falls in the microwave range. Standard microwave techniques are then used to demodulate the intermediate frequency signal.

The polarization states of the two interfering light waves must be matched at the mixer in order to maintain the optimal signal sensitivity. If ordinary non-polarization preserving single mode optical fiber is used as the transmission medium, then the birefringence present in such fiber will in general give rise to a mismatch in polarization state between the two interfering light waves at the photodetector. The amount of the mismatch will be unstable with time for the reasons described above in the case of the fiber optic rotation sensor. To maintain the required polarization state match a compensating birefringence effect must be induced in the local oscillator or in the signal arms of the receiver. The active polarization control system used in the fiber optic rotation sensor can be used to provide the compensating birefringence.

The prior polarization control techniques when used in a coherent fiber optic communications system require an active polarization controller in each fiber arm that goes into the 3 dB coupler and one or two polarizers depending upon whether or not the balanced mixer approach is used. The polarizers could alternatively be replaced by a polarization preserving coupler. Another method for overcoming the polarization state mismatch utilizes a polarization insensitive receiver, a bulk optical polarizing beam splitter and two sets of detector electronics. If the balanced mixer approach is used then the number of components doubles. All of these prior art polarization control techniques have excessive numbers of components, complexity and high cost.

Mohr, F. A. and Scholz, U. "Polarization Control for an Optical Fiber Gyroscope", Fiber Optic Rotation and Related Technology, Springer Verlag, 1982, pp. 163-168 describes a bulk optics implementation of a system for propagating an optical signal of a selected polarization in an optical fiber. The apparatus includes an optical fiber, a polarizing beam splitter for providing an optical output signal from the optical fiber, a photodetector, a pair of PZT fiber squeezers, and feedback electronics. The polarizing beam splitter takes light of both the desired polarization and the undesired polarization from the optical fiber. After the signal taken from the fiber has been polarized, it impinges upon the photodetector, which produces an electrical error signal indicative of the undesired polarization. The feedback electronics includes a pair of proportional integral controller circuits that drive the PZT fiber squeezers. The controller circuits are modulated with quadrature signals from a quadrature oscillator that produces two oscillatory signals that are $\pi/2$ out of phase.

U.S. Pat. No. 4,753,507 to DePaula, et al. discloses a fiber squeezer including a frame that applies a preload to an optical fiber to permit variation of the birefringence by either increasing or decreasing the preload. The optical fiber and a piezoelectric transducer are retained in the frame, and a voltage source is connected to the piezoelectric transducer to control the force on the fiber, which controls the refractive indices of the fiber by means of the photoelastic effect. DePaula et al. also disclose three fiber squeezers arranged in a line along the length of an optical fiber to adjust the polarization of light guided by the fiber.

U.S. Pat. Nos. 4,729,622 to Pavlath, 4,725,113 to Chang et al. and 4,695,123 all disclose optical fiber polarization control systems that include a polarizer and a system of fiber squeezers. The polarizer couples from the optical fiber light of the undesired polarization. The light coupled out of the fiber impinges upon a photodetector, which forms an electrical signal used to control the fiber squeezers. The fiber squeezers are actuated to provide the polarization input to the polarizer that minimizes the intensity of the light coupled from the fiber.

U.S. Pat. No. 4,389,090 to LeFevre discloses an optical fiber polarization controller that includes portions of the fiber wound around three spools. The spools are rotatable on a common axis to adjust the polarization of the light guided by the fiber.

SUMMARY OF THE INVENTION

The present invention overcomes the difficulties of the prior art active polarization control systems by providing two dimensional polarization controller modulation. The advantages of the present invention are achieved without the necessity of using costly polarization preserving fiber.

The present invention provides polarization feedback signals to correct polarization state errors in a fiber optic rotation sensor by orthogonal modulation of two banks of birefrigence transducers situated inside the rotation sensing loop. The present invention thus has the advantage of avoiding the use of more complex and costly dual output polarizers.

The present invention provides polarization feedback signals to correct polarization state errors in coherent fiber optic communications systems by orthogonal modulation of two banks of birefringence transducers situated in either the communications or local oscillator signal arms at the receiver. The present invention thus has the advantage of reduced complexity over other systems while permitting a significant increase in the communications data bandwidth.

A system according to the present invention for controlling the polarization of light guided by an optical waveguide comprises means for controlling the birefrigence of the optical waveguide including a first transducer and a second transducer arranged to act on the optical waveguide along parallel axes and a third transducer being on an axis that is placed between the parallel axes and angularly displaced by 45° therefrom. The invention further includes means for applying a first control signal to each of the first and second transducers, and means for applying a second control signal to the third transducer, the first and second control signals being in time quadrature. The system includes means for forming an electrical signal indicative of the intensity of light guided by the optical waveguide and means for processing the electrical signal to form an error signal indicative of differences between the polarization state of light guided by the optical waveguide and a predetermined desired polarization state. The invention includes means for combining the error signal with the first and second control signals to minimize the difference between the polarization state of light guided by the optical waveguide and the desired polarization state.

Each of the transducers included in the system according to the present invention preferably comprises a piezoelectric fiber squeezer that adjusts the birefringence of the optical waveguide by means of the photoelastic effect.

The system according to the present invention may further comprise a polarizer arranged to provide a reference polarization in the optical waveguide.

The system may also further comprise a first oscillator for producing the first control signal, first means for amplifying the first control signal, a second oscillator for producing the second control signal, second means for amplifying the second control signal, and means for providing independent gain control for the first and second amplifying means.

The polarization controller system according to the present invention preferably further comprises a dual channel phase sensitive detector responsive to both in-phase and quadrature signals for demodulating the electrical signal indicative of the intensity of light guided by the optical waveguide.

The present invention also includes a fiber optic rotation sensor formed to include the polarization controller described above. The fiber optic rotation sensor according to the present invention comprises a length of optical fiber formed to include a sensing loop, means for introducing counterpropagating optical waves into the sensing loop, means for processing the counterpropagating optical waves to produce a signal indicative of rotation of the sensing loop and means for processing the signal indicative of rotation of the sensing loop to control the polarization of the counterpropagating light waves. The fiber optic rotation sensor according to the present invention may further comprise a polarizer arranged to provide a reference polarization for the counterpropagating optical waves.

The present invention also includes a coherent optical communications system that comprises the polarization controller system described above. The coherent optical communications system according to the present invention includes means for producing a first optical signal that includes an optical carrier signal with a data signal superimposed thereon. The coherent optical communications system further includes means for producing a second optical signal for demodulating the data signal and means for optically mixing the first and second optical signals. The coherent optical communications system also includes means for processing the mixed optical signals to control the polarization of the second optical signal so that the first and second optical signals have the same polarization when they are mixed.

The coherent optical communications system may further comprise a first optical waveguiding means for guiding the first optical signal, a second optical waveguiding means for guiding the second optical signal, optical coupler means for combining the first and second optical signals, detector means for producing an electrical signal indicative of the intensity of the combined optical signals and means for processing the electrical signal to produce an error signal indicative of differences between the polarization state of light guided by the first and second optical waveguiding means.

The present invention also includes a method for controlling the polarization of light guided by an optical waveguide that comprises the steps of controlling the birefringence of the optical waveguide by the steps of arranging a first transducer and a second transducer to act on the optical waveguide along parallel axes and placing a third transducer on an axis that is placed between the parallel axes and angularly displaced by 45° therefrom. The method also includes the step of applying a first control signal to each of the first and second transducers and applying a second control signal to the third transducer, the first and second control signals being in time quadrature. The method also includes the steps of forming an electrical signal indicative of the intensity of light guided by the optical waveguide and processing the electrical signal to form an error signal indicative of differences between the polarization state of light guided by the optical waveguide and a predetermined desired polarization state. The method further includes the step of combining the error signal with the first and second control signals to minimize the difference between the polarization state of light guided by the optical waveguide and the desired polarization state.

The method may also include the step of forming each of the transducers to comprise a piezoelectric fiber squeezer that adjusts the birefringence of the optical waveguide by means of the photoelastic effect. The method may also further comprise the step of providing a reference polarization in the optical waveguide.

The method according to the present invention may also include the steps of producing the first control signal with a first oscillator, amplifying the first control signal, producing the second control signal with a first oscillator, amplifying the second control signal, and providing independent gain control for the first and second amplifying means.

The method according to the present invention preferably further comprises the step of detecting the in-phase and quadrature signals with a dual channel phase sensitive detector responsive to both in-phase and quadrature signals for demodulating the electrical signal indicative of the intensity of light guided by the optical waveguide.

BRIEF DESCRIPTION OF THE DRAWINGS

FIG. 7 illustrates a manually adjusted spool-type polarization controller for controlling the polarization of light in an optical fiber;

FIG. 8 illustrates a piezoelectrically driven, stress inducing, tri-bank polarization controller;

FIG. 9 illustrates a polarizer for polarizing light guided by an optical fiber.

DESCRIPTION OF THE PREFERRED EMBODIMENT

Figure 1:
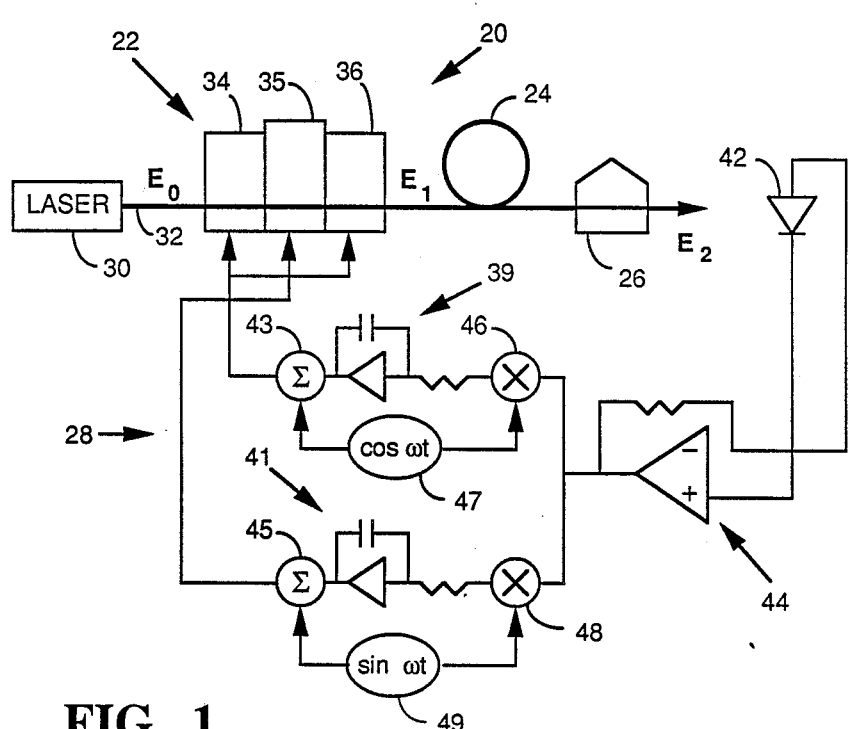
FIG. 1 illustrates a polarization control system that includes a laser source, optical fiber, a tri-bank polarization controller, a polarizer, a detector and a dual channel analog servo.

Referring to FIG. 1 a polarization control servo system 20 includes a polarization controller 22, an optical fiber sensor loop 24, a polarizer 26 and an electronic circuit 28. A light source 30, which may be a solid state laser, provides a coherent optical beam of polarization $E_0$ that is input to an optical 32.

The beam of polarization $E_0$ is input by the optical fiber 32 to the polarization controller 22. Referring to FIG. 8, the polarization controller 22 may comprise three PZT fiber squeezers 34–36. Suitable structures for the PZT fiber squeezers 34–36 are shown in U.S. Pat. No. 4,733,507 to DePaula et al. That patent is assigned to Litton Systems, Inc., owner of the present invention and is incorporated by reference into the present disclosure.

Referring still to FIG. 8, each of the PZT fiber squeezers 34–36 includes a frame 38 that retains a PZT actuator 40. The optical fiber 32 is retained between the frame 38 and an end of the actuator 40 so that application of a suitable voltage to the actuator 40 adjusts the transverse compressive force that the actuator 40 applies to the optical fiber 32. Application of a transverse compressive force to the optical fiber 32 changes the refractive indices of the fiber core and thereby adjusts the birefringence of the optical fiber 32. Adjusting the birefringence of the optical fiber 32 adjusts the polarization of light propagated in the segment of the optical fiber 32 under compression.

The three PZT fiber squeezers 34–36 are closely spaced along the length of the optical fiber 32. The fiber squeezers 34 and 36 apply parallel compressive forces to the optical fiber 32. The compressive force that the fiber squeezer 35 applies to the optical fiber 32 is 45° from the force applied by the squeezers 34 and 36. The three PZT fiber squeezers 34–36 provide means for converting any arbitrary polarization input to the polarization controller 22 to a desired polarization output.

The polarization of the light beam output from the polarization controller 22 is designated as $E_1$. The beam of polarization $E_1$ is input to the optical fiber sensor loop 24, which is formed in the optical fiber 32. The optical beam output from the optical fiber loop 24 may then be input to polarizer 26, which outputs a signal of polarization $E_2$. The signal having polarization $E_2$ then impinges upon a photodetector 42, which produces an electrical current indicative of the intensity of the light beam incident thereon.

The electrical signal output from the photodetector 42 is amplified by an amplifier 44. The amplified signal is then input to a pair of mixers 46 and 48. A modulating signal 47 that depends on cos ($\omega t$) is input to the mixer 46 and a modulating signal 49 dependent upon sin ($\omega t$) is input to the mixer 48. The oscillatory inputs to the mixers 46 and 48 are thus in quadrature with each other. The outputs of the mixers 46 and 48 are input to integrators 39 and 41, respectively. The integrated signals output from the integrators 39 and 41 are input to summing circuits 43 and 45, respectively. The summing circuit 43 also receives the cos ($\omega t$) signal input to the mixer 46 while the summing circuit 45 receives the sin ($\omega t$) signal that is input to the mixer 48.

The Jones matrix of the first PZT squeezer 34 is $$PC_1 = \begin{vmatrix} 1 & 0 \\ 0 & e^{i\phi_1} \end{vmatrix} \quad (1)$$

The 45° rotation between PZT squeezers 34 and 35 is modelled by the Jones matrix $$PC_2 = \begin{vmatrix} \frac{1}{2^{\frac{1}{2}}} & \frac{1}{2^{\frac{1}{2}}} \\ \frac{-1}{2^{\frac{1}{2}}} & \frac{1}{2^{\frac{1}{2}}} \end{vmatrix} \tag{2}$$

The Jones matrix of the second PZT squeezer 35 is $$PC_3 = \begin{vmatrix} 1 & 0 \\ 0 & e^{i\phi_2} \end{vmatrix} \tag{3}$$

The 45° rotation between PZT squeezers 35 and 36 is modelled by the Jones matrix $$PC_4 = \begin{vmatrix} \frac{1}{2^{\frac{1}{2}}} & \frac{-1}{2^{\frac{1}{2}}} \\ \frac{1}{2^{\frac{1}{2}}} & \frac{1}{2^{\frac{1}{2}}} \end{vmatrix} \tag{4}$$

The Jones matrix of the third PZT squeezer 36 is $$PC_5 = \begin{vmatrix} 1 & 0 \\ 0 & e^{i\phi_1} \end{vmatrix} \tag{5}$$

The angles $\phi_1$ and $\phi_2$ are the induced birefringences or phase differences of the light in the optical fiber 32 in the three PZT squeezers 34–36. The first and third fiber squeezers 34 and 36 are electrically connected in parallel so that the birefringences that they introduce in the optical fiber 32 are nominally equal. It is important to note that, although $\phi_1$ is the induced optical phase difference between the x and y coordinates, where x is the pass axis of the polarizer 26, and could be thought of as an absolute phase added to the y direction of light, $\phi_2$ is not as simply related to the x or y axes. The angle $\phi_2$ may be considered to be an absolute phase added to light propagating in a direction rotated by 45° from the y direction. Although an equivalence may be drawn between the $\phi_1$ and y coordinates, no such equivalence can be drawn between the $\phi_2$ and x coordinates.

The input polarization state $E_0$ from the optical source 30 may be written in Jones matrix form as $$E_0 = \begin{vmatrix} (c_x \, e^{ik_xz}) \\ (c_y \, e^{ik_yz}) \end{vmatrix} \tag{6}$$

where the propagation constant in the j-th direction is $$k_j = \frac{2\pi n_j}{\lambda_0} \tag{7}$$

and $n_j$ is the index of refraction in the j-th direction. The Jones matrix of the polarizer 26 is $$P = \begin{vmatrix} 1 & 0 \\ 0 & \epsilon \end{vmatrix} \tag{8}$$

where $\epsilon$ is the polarizer amplitude extinction ratio. The extinction ratio of the polarizer 26 specifies how well the polarizer filters out the undesired polarization mode, which is the orthogonal mode for fiber optic rotation sensors.

The polarization state of the light beam $E_2$ at the detector 42 is derived by multiplying the Jones matrices of all of the components in the polarization control servo system 20 and the initial polarization state $E_0$ together, which gives:

$$E_2 = P \cdot PC_5 \cdot PC_4 \cdot PC_3 \cdot PC_2 \cdot PC_1 \cdot E_0 \tag{9}$$

$$PC_{51} = PC_5 \cdot PC_4 \cdot PC_3 \cdot PC_2 \cdot PC_1 \tag{10}$$

$$= \tfrac{1}{2} \begin{vmatrix} 1 + e^{i\phi_2} & e^{i\phi_1} - e^{i(\phi_1+\phi_2)} \\ e^{i\phi_1} - e^{i(\phi_1+\phi_2)} & e^{i2\phi_1} + e^{i(2\phi_1+\phi_2)} \end{vmatrix} \tag{11}$$

$$E_1 = PC_{51} \cdot E_0 \tag{12}$$

$$= \tfrac{1}{2} \begin{vmatrix} (c_x \, e^{ik_xz} + c_x \, e^{i(k_xz+\phi_2)} + c_y \, e^{i(k_yz+\phi_1)} - c_y \, e^{i(k_yz+\phi_1+\phi_2)}) \\ (c_x \, e^{i(k_xz+\phi_1)} - c_x \, e^{i(k_xz+\phi_1+\phi_2)} + c_y \, e^{i(k_yz+2\phi_1)} + c_y \, e^{i(k_yz+2\phi_1+\phi_2)}) \end{vmatrix} \tag{13}$$

$$E_2 = P \cdot E_1 \tag{14}$$

$$= \tfrac{1}{2} \begin{vmatrix} (c_x \, e^{ik_xz} + c_x \, e^{i(k_xz+\phi_2)} + c_y \, e^{i(k_yz+\phi_1)} - c_y \, e^{i(k_yz+\phi_1+\phi_2)}) \\ \epsilon \cdot (c_x \, e^{i(k_xz+\phi_1)} - c_x \, e^{i(k_xz+\phi_1+\phi_2)} + c_y \, e^{i(k_yz+2\phi_1)} + c_y \, e^{i(k_yz+2\phi_1+\phi_2)}) \end{vmatrix} \tag{15}$$

The intensity at the detector 42 is proportional to the modulus squared of the wave $E_2$, which gives $$E_2 E_2 = \tfrac{1}{4}[(1+\epsilon^2) \cdot (c_x^2 + c_y^2)(1-\epsilon^2)[(c_x^2 - c_y^2) \cos(\phi_2) + 2c_x c_y \sin(k_yz - k_xz + \phi_1) \sin(\phi_2)]]. \tag{16}$$

The equations can be simplified by letting $\phi_1 = \kappa_1 v_1$ and $\phi_2 = \kappa_2 v_2$ where $v_j$ are the voltages applied to the PZT squeezers and $\kappa_1 = 2\pi K_1$ and $\kappa_2 = 2\pi K_2$ where the $K_j$ are voltage space frequencies in cycles per volt and $$K_1 = \frac{1}{X_1} \text{ and } K_2 = \frac{1}{X_2}$$

where the $X_j$ are the voltage space periods in volts.

The average power at the detector 42 as a function of the applied voltages is $$I(v_1, v_2) = \tfrac{1}{4}[(1+\epsilon^2) \cdot (c_x^2 + c_y^2) + (1-\epsilon^2)[(c_x^2 - c_y^2) \cos(\kappa_2 \cdot v_2) + 2(1-\epsilon^2) c_x c_y \sin(k_yz - k_xz + \kappa_1 \cdot v_1) \sin(\kappa_2 \cdot v_2)]. \tag{17}$$

One can arrange the optical fiber 32 between the laser source and the polarization controller so that the polarization state of the wave input to the polarization controller 22 results in $c_x = c_y = c$ and $k_y = k_x$. This can be achieved, for example, by selecting this segment of fiber to be high birefringence fiber with its axis of symmetry oriented 45° with respect to the first polarization controller stage 34. The average power then becomes $$I(\nu_1, \nu_2) = \frac{c^2}{c} [1 + \epsilon_2 + (1 - \epsilon^2)\sin(\kappa_1 \cdot \nu_1)\sin(\kappa_2 \cdot \nu_2)]. \quad (18)$$

Application of the Invention in a Fiber optic Rotation sensor

Figure 4:
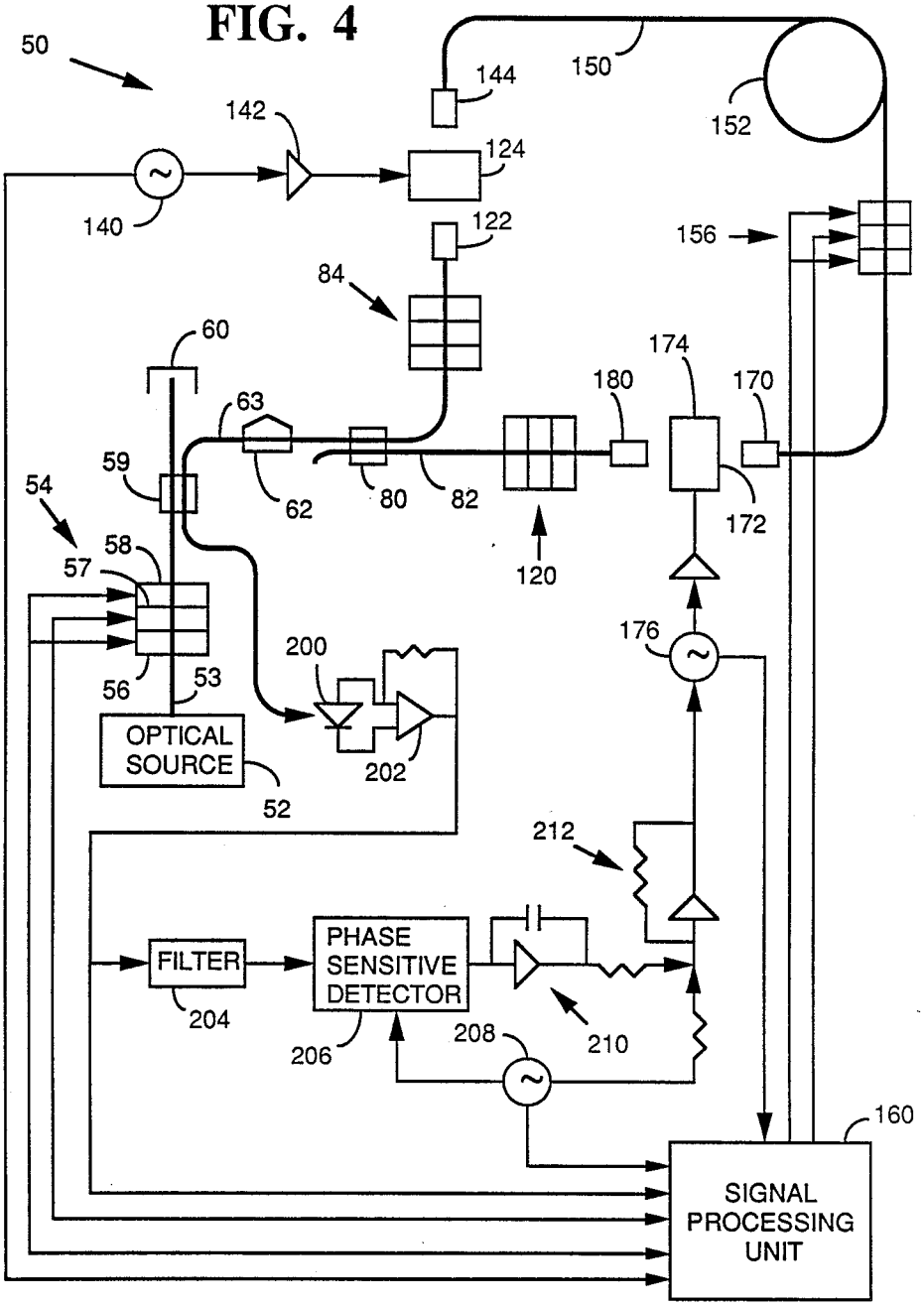
FIG. 4 schematically illustrates a fiber optic rotation sensor that includes active polarization control.

FIG. 4 illustrates a fiber optic rotation sensor 50 that includes an automatic polarization controller system according to the present invention. An optical source 52 provides an optical signal to an optical fiber 53 which propagates the signal to source polarization controller 54 that preferably comprises three PZT fiber squeezers 56-58 similar to the fiber squeezers 34-36 described above. The beam output from the source polarization controller 54 is input to a fiber optic directional coupler 59, which couples part of the signal from the optical fiber 53 into an optical fiber 63. Light that is not coupled from the fiber 53 into the fiber 63 is absorbed in a light trap 60.

The signal in the fiber 63 then propagates to a polarizer 62, which is illustrated in FIG. 9. The polarizer 62 may be formed as described in U.S. Pat. No. 4,386,822 to Bergh, which is assigned to the Board of Trustees of the Leland Stanford University. U.S. Pat. No. 4,386,822 is incorporated by reference into the present dislosure. Other types of polarizers may be used. In particular, it is not necessary to monitor the beam ejected from the polarizer in the present invention. Therefore, the invention may be practiced using a York fiber polarizer, Varnham, M.P., Payne, D.N., Barlow, A.J., Tarbox, E.J., Optics Letters No. 9, p. 306, 1984.

As disclosed in Bergh, the polarizer 62 of FIG. 9 may be formed by mounting the fiber 63 in a convexly curved groove in a substrate 70. The substrate 70 and central portion of the fiber 63 in the groove are lapped to form coplanar optically flat surfaces in the cladding of the fiber 63 and the substrate 70. A birefringent crystal 72 is mounted on the optically flat surfaces in close proximity to the core of the fiber 63. The crystal 72 and the lapped surface of the fiber 63 form the polarizer 62. The evanescent field of light in the fiber 63 interacts with the crystal 72 in a manner that depends on the polarization of the light waves. A polarization that has a slower wave velocity in the crystal 72 than in the fiber 63 is removed from the fiber 63 and excites a bulk wave in the crystal 72. A polarization that has a higher wave velocity in the crystal 72 than in the fiber 63 remains guided by the fiber 63. The refractive indices of the crystal are such that one of the two possible linear polarization states in the fiber 63 will excite a bulk wave in the crystal 72 while the other polarization state remains guided by the fiber 63.

The polarizer 62 may also be formed as described in U.S. Pat. No. 4,666,235 to Pavlath, U.S. Pat. No. 4,695,123 to Chang et al., or U.S. Pat. No. 4,725,113 to Chang et al., all of which are assigned to Litton Systems, Inc., owner of the present invention. The disclosures of these patents are incorporated into the present disclosure.

The output of the polarizer 62 then is incident upon an optical coupler 80 which divides the input from the polarizer 62 equally between the fiber 63 and a fiber 82. The optical coupler preferably couples light energy between the fibers 63 and 82 via evanescent field coupling. The signal remaining in the fiber 63 passes through a polarization controller 84.

FIG. 7 shows one structure suitable for use in forming the polarization controller 84. A suitable structure for the polarization controller 84 of FIG. 7 is disclosed in U.S. Pat. No. 4,389,090, which is hereby incorporated by reference into the present disclosure.

Referring to FIG. 7, the polarization controller 84 includes a base 98 on which a plurality of upright blocks 99-102 are mounted. Between adjacent blocks 99-102 a plurality of spools 103-105 are tangentially mounted on a plurality of shafts 106-108, respectively. The shafts 106-108 are axially aligned with each other, and are rotatably mounted between the corresponding blocks 99-102. The spools 103-105 are generally cylindrical and are positioned tangentially to the shafts 106-108, with the axes of the spools 103-105 being perpendicular to the axes of the shafts. The fiber 63, for example, extends through axial bores in the shafts 106-108 and is wrapped about each of the spools 103-105 to form three corresponding coils 109-111. The radii of the coils 109-111 are such that the fiber 63 is stressed to form a birefringent medium in each of the coils 109-111. The three coils 109-111 may be rotated independently of one other about the axes of the shafts 106-108, respectively, to adjust the orientation of the birefringence of the fiber 63 and, thus, control the polarization of the light passing therethrough.

The diameter and number of turns in the coils 109-111 are such that the outer coils 109 and 111 provide a phase delay of one-quarter wavelength, while the central coil 110 provides a phase delay of one-half wavelength. The quarter wavelength coils 109 and 111 control the ellipticity of the polarization, and the half wavelength coil 110 controls the direction of polarization.

The light coupled by the coupler 80 into the fiber 82 impinges upon a polarization controller 120, which may be substantially identical to the polarization controller 84. The light coupled into the fiber 82 forms the counterclockwise wave that is input to the sensing coil of the fiber optic rotation sensor 50.

The output of the polarization controller 84 propagates in the fiber 63 to a lens 122 that focuses the light on an acoustooptic modulator 124 that forms a Bragg cell frequency shifter. A closed loop fiber optic rotation sensor such as the fiber optic rotation sensor 50 may include a frequency shifter near where each of the counterpropagating waves is introduced into the sensing coil to null the rotation-induced phase difference between them. The amount that the waves must be adjusted in frequency to null the Sagnac phase shift indicates the rotation rate of the sensing loop. The amount of the frequency shift may be determined by measuring the electrical drive signal supplied to the frequency shifter. The use of frequency shifters to null out the Sagnac phase shift greatly increases the dynamic range of the fiber optic rotation sensor.

A Bragg cell acoustooptic-modulator typically comprises a crystal that is driven by an acoustic transducer to produce acoustic waves. The acoustic waves interact with a light beam that propagates through the crystal. Applying modulating signals to the acoustic transducer controls the frequency $\omega_m$ of the acoustic waves in the crystal. The acoustic wavefronts in the crystal function as a moving diffraction grating, which transmits a first portion of the incident optical beam and reflects a second portion. If the optical signal has frequency $\omega_o$, then the portion of the beam reflected from the Bragg cell has frequency $\omega_o + \omega_m$; and the transmitted portion of the beam has the original frequency $\omega_o$.

Figure 10:
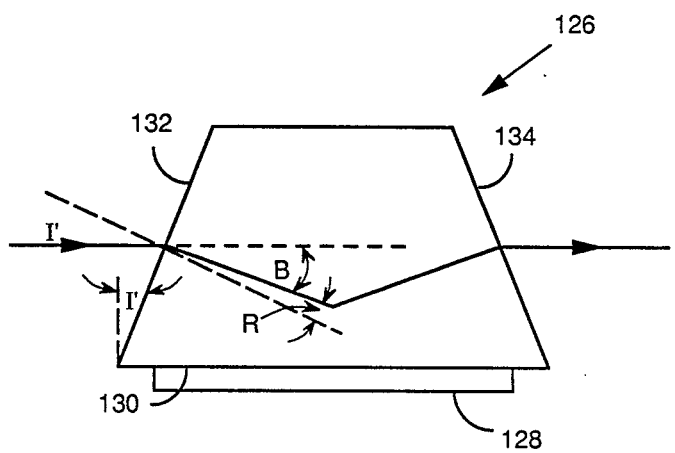
FIG. 10 illustrates an acoustooptic modulator that may be used to shift the frequency of light.

FIG. 10 illustrates a preferred structure for the acoustooptic modulator 124. The acoustooptic modulator 124 includes a crystal 126 having an acoustic transducer 128 attached to a surface 130 thereof. The crystal 126 includes a pair of surfaces 132 and 134 that are angled with respect to the surface 130. The surfaces 130, 132 and 134 preferably are formed to be optically flat without surface irregularities or striations.

Still referring to FIG. 10, the incident beam is parallel with the surface 130 so that the beam strikes the surface 132 at an angle I' with respect to the normal to the surface 132. The angled surface 132 is precision ground and employs the refractive index of the crystal 126 to compensate for the Bragg angle. A portion of the incident light diffracts into the crystal and interacts with acoustic wavefronts produced by the acoustic transducer 128. Part of the optical beam in the crystal diffracts from the acoustic wavefront and is directed toward the surface 134. The optical beam refracts at the surface 134 and emerges from the crystal collinear with the incident beam.

The acoustooptic modulator 124 is driven by an oscillator 140 that preferably is fixed to apply a fixed modulation frequency. The modulating signal from the oscillator 140, which has an output connected to the signal processing unit 160, is amplified by an amplifier 142 before being applied to the acoustic transducer 128.

The output of the acoustooptic modulator 124 is then incident upon a lens 144 that focuses the beam onto an end of an optical fiber 150 in which a sensing coil 152 is formed. The output of the acoustooptic modulator 124 forms the clockwise wave in the fiber optic rotation sensor 50 as viewed in FIG. 4. After traversing the sensing coil 152, the clockwise wave then reaches a loop polarization controller 156, which is prererably an automatic polarization controller according to the present invention as described above with reference to FIG. 1. The loop polarization controller 156 and the source polarization controller 54 are connected to a signal processing unit 160.

After traversing the loop polarization controller 156, the clockwise wave then reaches a lens 170, which directs the beam to a surface 172 of an acoustooptic modulator 174. The acoustooptic modulator 174 is formed similarly to the acoustooptic modulator 124. The acoustooptic modulator 174 is driven by a voltage controlled oscillator 176 that has an output connected to the signal processing unit 160. The output of the voltage controlled oscillator 176 is a voltage having a frequency dependent upon the drive voltage input to the voltage controlled oscillator 176. The frequency applied to the voltage controlled oscillator 176 is adjusted to null the Sagnac phase shift between the clockwise and counterclockwise waves.

The output of the acoustooptic modulator 174 is incident upon a lens 180 that focuses the clockwise wave on the optical fiber 82, which guides the light to the polarization controller 120. The polarization controller 120 is similar to the polarization controller 84.

The counterclockwise wave traverses the same path as the clockwise wave but in the opposite direction. The waves are shifted in phase if the sensing coil 152 rotates about its sensing axis. The waves combine in the coupler 80, which causes the waves to form an interference pattern in the fiber 63. The interfering waves are guided to a photodetector 200, which forms an electrical signal indicative of the optical intensity in the interference pattern.

The electrical output of the photodetector 200 is amplified by an amplifier 202 and then filtered by a filter 204, which removes second harmonics from the signal. The output of the filter 204 is then sent to a phase sensitive detector 206, which receives a reference signal from a signal generator 208. The output of the phase sensitive detector 208 is then integrated by an integrator 210. The reference signal from the signal generator 208 and the output of the integrator 210 are input to a summing amplifier 212. The summing amplifier 212 supplies the drive voltage to the voltage controlled oscillator 176. The drive voltage to the voltage controlled oscillator 176 is adjusted to provide a frequency shift in the acoustooptic modulator 174 to null the Sagnac phase shift.

Figure 2:
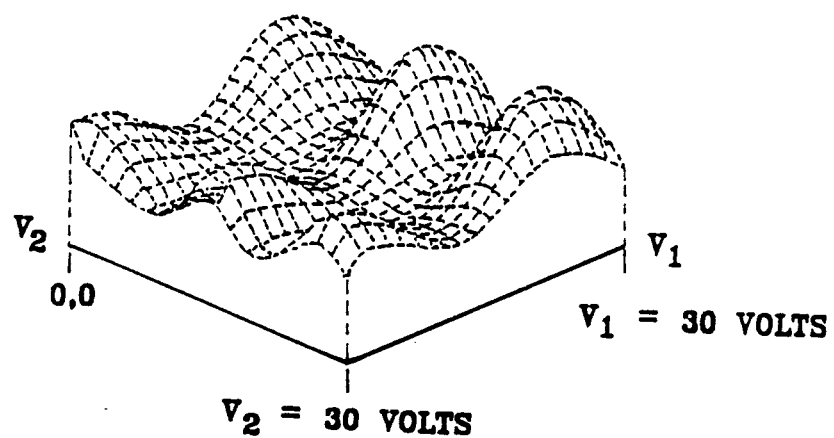
FIG. 2 is a three dimensional plot of a fiber optic rotation sensor output signal versus the voltages applied to two banks of birefringence transducers in a polarization controller utilized with a sensing loop.
Figure 3:
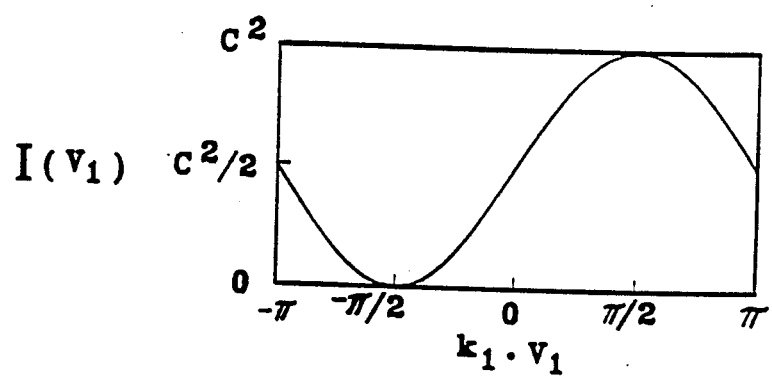
FIG. 3 is a graphical representation of the output signal of FIG. 2 as a function of the voltage applied to one the birefringence transducers when the other birefringence transducer is adjusted for maximum light output.

A data sample collected by sampling the second harmonic of the fiber optic rotation sensor 50 shown in FIG. 4 versus the voltages applied to the polarization controller 156 is shown in FIG. 2. The data are well described by Equation (18) derived above. On the Poincare sphere the peak of the intensity structure corresponds to a well defined polarization state. This polarization state is defined by the requirement of maximizing the output signal by controlling the polarization state on the exit side of the polarizer so that it lines up with the direction defined by the polarizer. For small perturbations of the fast-slow axis phase difference or birefringence the resulting polarization state changes for each axis are orthogonal with respect to the other axis. This is usually shown by noting that when one of the phases approaches $n\pi/2$. The other phase is independent of the first phase shown in FIG. 3 for $\epsilon=0$. Therefore the desired polarization state may be maintained by implementing a dual channel AC servo. Returning to the structure of FIG. 2, it can be seen that by applying in phase (sine) and quadrature (cosine) cosine modulations to the two banks of birefringence transducers we will be moving in an ellipse around the peak of the structure when the DC components are at the setting corresponding to the maximum. Similarly, we will be swinging the polarization state on the Poincare sphere around the optimal setting at the maximum output point and the elliptical action will result in a constant signal output.

The general case where we are not at the peak of the output signal we know from AC servo theory that if we do modulate the modulator output signal then we can multiply the resulting I and Q signals by a servo loop gain and feed them back as corrections to the DC settings of the transducer voltages. We will in effect be minimizing the fundamental of the polarization controller modulation frequencies. Modulation here refers to the sinusoidal varying or stepping of the polarization controller transducer voltages.

Method of Operation

The derivation presented below shows mathematically how the polarization control servo according to the present invention functions to provide the advantages over the prior art. In this analysis the voltage coordinate $v_1$ is the in—phase (I) channel and the voltage coordinate $v_2$ is the quadrature (Q) channel so that the voltages may be defined explicitly as:

$v_1$ = in phase birefringence transducer voltage; and
$v_2$ = quadrature phase birefringence transducer voltage. Now apply modulating signals to the voltages $v_1$ and $v_2$ so that $$v_1 = B_1 \sin \omega_1 t + v_{1off} \tag{19}$$

$$v_2 = B_2 \cos \omega_2 t + v_{2off} \tag{20}$$

where $B_1$ and $B_2$ are the modulation amplitudes;
$\omega_1$ and $\omega_2$ are $2\pi$ times the frequencies of modulation;
$t$ is time; and
$v_{1off}$ and $v_{2off}$ are the applied DC components of the transducer voltages.

The in intensity at the detector then becomes $$I(v_1, v_2) = \frac{c^2}{2}\{1 + \epsilon^2 + (1 - \epsilon^2)\sin(\kappa_1 B_1 \sin\omega_1 t + \kappa_1 v_{1off}) \cdot \sin(\kappa_2 B_2 \sin\omega_2 t + \kappa_2 v_{2off})\} \tag{21}$$

Now let
$C_1 = \cos(\kappa_1 v_{1off})$
$S_1 = \sin(\kappa_1 v_{1off})$
$C_2 = \cos(\kappa_2 v_{2off})$
$S_2 = \sin(\kappa_2 v_{2off})$
$a_1 = \kappa_1 B_1$
$a_2 = \kappa_2 B_2$ Then using the well known trigonometric identity $\sin(A+B) = \sin A \cos B + \cos A \sin B$ gives $$I(v_1, v_2) = \frac{c^2}{2}\{1 + \epsilon^2 + (1 - \epsilon^2)[\sin(a_1\sin\omega_1 t)C_1 + \cos(a_1\sin\omega_1 t)S_1] \cdot [\sin(a_2\cos\omega_2 t)C_2 + \cos(a_2\cos\omega_2 t)S_2] \tag{22}$$

or $$I(v_1, v_2) = \tag{23}$$

$$\frac{c^2}{2}\{1 + \epsilon^2 + (1 - \epsilon^2)[C_1 C_2 \sin(a_1\sin\omega_1 t)\sin(a_2\cos\omega_2 t) + C_1 S_2 \sin(a_1\sin\omega_1 t)\cos(a_2\cos\omega_2 t) + S_1 C_2 \cos(a_1\sin\omega_1 t) \cdot \sin(a_2\cos\omega_2 t) + S_1 S_2 \cos(a_1\sin\omega_1 t)\cos(a_2\cos\omega_2 t)]\}.$$

Using the definitions of the Bessel's functions gives $$\cos(a\sin\theta) = J_0(a) + 2(J_2(a)\cos 2\theta + J_4(a)\cos 4\theta + \ldots) \tag{24}$$

$$\sin(a\sin\theta) = 2(J_1(a)\sin\theta + J_3(a)\sin 3\theta + \ldots$$

$$\cos(a\cos\theta) = J_0(a) - 2(J_2(a)\cos 2\theta - J_4(a)\cos 4\theta + \ldots)$$

$$\sin(a\cos\theta) = 2(J_1(a)\cos\theta - J_3(a)\cos 3\theta + J_5(a)\cos 5\theta \ldots$$

$$I(v_1, v_2) = \frac{c^2}{2}\{1 + \epsilon^2 + (1 - \epsilon^2)[C_1 C_2[2(J_1(a_1)\sin\omega_1 t + J_3(a_1)\sin 3\omega_1 t + \ldots)] \cdot$$

$$[2(J_1(a_2)\cos\omega_2 t - J_3(a_2)\cos 3\omega_2 t + J_5(a_2)\cos 5\omega_2 t - \ldots)] +$$

$$C_1 S_2[2(J_1(a_1)\sin\omega_1 t + J_3(a_1)\sin 3\omega_1 t + \ldots)] \cdot$$

$$[J_0(a_2) - 2(J_2(a_2)\cos 2\omega_2 t - J_4(a_2)\cos 4\omega_2 t + \ldots)] +$$

$$S_1 C_2[J_0(a_1) + 2(J_2(a_1)\cos 2\omega_1 t + J_4(a_1)\cos 4\omega_1 t + \ldots)] \cdot$$

$$[2(J_1(a_2)\cos\omega_2 t - J_3(a_2)\cos 3\omega_2 t +$$

$$J_5(a_2)\cos 5\omega_2 t - \ldots)] S_1 S_2[J_0(a_1) + 2(J_2(a_1)\cos 2\omega_1 t +$$

$$J_4(a_1)\cos 4\omega_1 t + \ldots)] [J_0(a_2) - 2(J_2(a_2)\cos 2\omega_2 t -$$

$$J_4(a_2)\cos 4\omega_2 t + \ldots)]]\}$$

Equation (24) describes the output of the polarization control system at the detector 42 of FIG. 1.

The servo gain is derived in the next section. The derivation begins by demodulating Equation (24) by multiplying by $\sin \omega t_1$ and integrating over the count period. The count period derives from the particular application for which the polarization controller is utilized. In a digital synchronous demodulation scheme the integration period should also be an integral number of periods $n$ of the modulation frequency.

In the case of the fiber optic rotation sensor shown in FIG. 4, we select $n=1$ for the source polarization controller and $n=9$ for the loop polarization controller. These values were also selected to minimize the coincidence of higher order harmonics that could cause parasitic coupling between the two polarization controllers.

Now let $\tau$ = integration period = count period ($\approx 1$ sec for the fiber optic rotation sensor). The following definitions and replacements are then used:

$$\omega_1 = \omega_2 = \omega = 2\pi f = \frac{2\pi n}{\tau}$$

$$\theta = \omega t \quad d\theta = \omega dt$$

$$dt = \frac{d\theta}{\omega} \quad \theta(\tau) = \omega\tau = 2\pi n$$

$$\omega_{LPC} = 9\, \omega_{SPC}$$

Therefore $$\theta_{LPC} = 9\theta_{SPC} \quad \text{and} \quad \int_0^\tau dt = \frac{1}{\omega}\int_0^{n2\pi} d\theta.$$

The in phase signal intensity is then given by the integral $$I(v_1, v_2) \approx \frac{c^2}{2\omega} \int_0^{n2\pi} d\theta[(1 + \epsilon^2)\sin\theta + 4(1 - \epsilon^2) \tag{25}$$

$$4(1 - \epsilon^2)C_1 C_2 [J_1(a_1)J_1(a_2)\cos\theta\sin^2\theta +$$

$$J_1(a_2)J_3(a_1)\cos\theta\sin 3\theta\sin\theta - J_1(a_1)J_3(a_2)\cos 3\theta\sin^2\theta -$$

$$J_3(a_1)J_3(a_2)\cos 3\theta\sin 3\theta\sin\theta + J_1(a_1)J_5(a_2)\cos 5\theta\sin^2\theta +$$

$$J_3(a_1)J_5(a_2)\cos 5\theta\sin 3\theta\sin\theta] +$$

$$2(1 - \epsilon^2)C_1 S_2[J_0(a_2)J_1(a_1)\sin^2\theta + J_0(a_2)J_3(a_1)\sin 3\theta\sin\theta -$$

$$2J_1(a_1)J_2(a_2)\cos 2\theta\sin^2\theta - 2J_2(a_2)J_3(a_1)\cos 2\theta\sin 3\theta\sin\theta +$$

$$2J_1(a_1)J_4(a_2)\cos 4\theta\sin^2\theta + 2J_3(a_1)J_4(a_2)\cos 4\theta\sin 3\theta\sin\theta] +$$

$$2(1 - \epsilon^2)C_2 S_1[J_0(a_1)J_1(a_2)\cos\theta\sin\theta +$$

-continued $2J_1(\alpha_2)J_2(\alpha_1)\cos2\theta\cos\theta\sin\theta + 2J_1(\alpha_2)J_4(\alpha_1)\cos4\theta\cos\theta\sin\theta -$ $J_0(\alpha_1)J_3(\alpha_2)\cos3\theta\sin\theta - 2J_2(\alpha_1)J_3(\alpha_2)\cos2\theta\cos3\theta\sin\theta -$ $2J_3(\alpha_2)J_4(\alpha_1)\cos3\theta\cos4\theta\sin\theta + J_0(\alpha_1)J_5(\alpha_2)\cos5\theta\sin\theta +$ $2J_2(\alpha_1)J_5(\alpha_2)\cos2\theta\cos5\theta\sin\theta +$ $2J_4(\alpha_1)J_5(\alpha_2)\cos4\theta\cos5\theta\sin\theta](1-\epsilon^2)S_1S_2[J_0(\alpha_1)J_0(\alpha_2)\sin\theta +$ $2J_0(\alpha_2)J_2(\alpha_1)\cos2\theta\sin\theta +$ $2J_0(\alpha_2)J_4(\alpha_1)\cos4\theta\sin\theta - 2J_0(\alpha_1)J_2(\alpha_2)\cos2\theta\sin\theta -$ $4J_2(\alpha_1)J_2(\alpha_2)\cos^2 2\theta\sin\theta - 4J_2(\alpha_2)J_4(\alpha_1)\cos2\theta\cos4\theta\sin\theta +$ $2J_0(\alpha_1)J_4(\alpha_2)\cos4\theta\sin\theta + 4J_2(\alpha_1)J_4(\alpha_2)\cos2\theta\cos4\theta\sin\theta +$ $4J_4(\alpha_1)J_4(\alpha_2)\cos^2 4\theta\sin\theta]]$ Performing the integration gives $$I(\nu_1, \nu_2) \approx \frac{c^2\pi n}{\omega}(1-\epsilon^2)C_1S_2[J_1(\alpha_1)J_0(\alpha_2) + J_1(\alpha_1)J_2(\alpha_2) - \quad (26)$$

$$J_3(\alpha_1)J_2(\alpha_2) - J_3(\alpha_1)J_4(\alpha_2)].$$

The I and Q coordinates are now redefined with respect to a particular peak of Equation (18) so that $\Delta\nu_1 = \nu_{10} - \nu_{1\text{off}}$ $\Delta\nu_2 = \nu_{20} - \nu_{2\text{off}}$ where $\kappa_1\nu_{10} = (2n+1)\frac{\pi}{2}$ and $\kappa_2\nu_{20} = (2n+1)\frac{\pi}{2}$.

Then Equation (18) becomes $$I(\Delta\nu_1, \Delta\nu_2) = \frac{c^2}{2}[1 + \epsilon^2(1-\epsilon^2)\cos(\kappa_1\Delta\nu_1)\cos(\kappa_2\Delta\nu_2)]. \quad (27)$$

For small error signals $\Delta\nu_1, \Delta\nu_2$ $C_1 = \sin(\kappa_1\Delta\nu_1) \approx (\kappa_1\Delta\nu_1)$ and $S_2 = \cos(\kappa_1\Delta\nu_1) \approx 1.$ The small error in phase signal I for the continuous case is $$I_1(\nu_1, \nu_2) \approx \frac{c^2\pi n}{\omega}(1-\epsilon^2)\kappa_1\Delta\nu_1 \cdot [J_1(\alpha_1)J_0(\alpha_2) + \quad (28)$$

$$J_1(\alpha_1)J_2(\alpha_2) - J_3(\alpha_1)J_2(\alpha_2) - J_3(\alpha_1)J_4(\alpha_2)]$$

The servo loop gain is calculated from Equation (28):

$$G_1 \approx \frac{\Delta\nu_1}{I_1(\nu_1, \nu_2)} \approx \frac{\Delta\nu_1}{\left(\frac{c^2\pi n}{\omega}(1-\epsilon^2)\kappa_1\Delta\nu_1[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)]\right)} \quad (29)$$

For the case of $\epsilon$ tending to zero the gain becomes $$G_1 \approx \frac{X_1}{\left(\frac{2c^2\pi^2\tau}{\omega}[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)]\right)} \quad (30)$$

which becomes $$G_1 \approx \frac{X_1}{\{c^2\pi\tau[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)]\}} \quad (31)$$

For the fiber optic rotation sensor in which a pair of discrete digital servo loops are implemented, the integration in time is replaced by a summation of values separated by the sampling period $\Delta t$, so that the integral becomes $$\sum_{m=1}^{M} S(m\Delta t) = \frac{1}{\Delta t}\int_0^{\tau} S(t)dt \quad (32)$$

where $S(m\Delta t)$ is the discrete or sampled signal and $S(t)$ is the continuous signal. The time $\tau = M\Delta t$ = integration or count period so that $\Delta t = \frac{\tau}{M}$.

The frequency $\omega$ may be written as $\omega = \frac{2\pi}{T}$ where T is the period of polarization control modulation. The number M may be written as M=NCPC.NSTEPS where NCPC=n=number of cycles of modulation per count period $= \frac{\tau}{T}$ The number n=1 for the source polarization controller 54 and n=9 for the loop polarization controller 156. NSTEPS is the number of discrete samples in the modulating wave and is 954 for the source polarization controller 54 and 106 for the loop polarization controller 156. The number of counts per second, NCPS, may written as $\frac{1}{\tau}$.

Therefore the time interval $\Delta t$ is $$\Delta t = \frac{1}{NCPC \cdot NSTEPS \cdot NCPS} = \frac{T}{NSTEPS}$$

and $$\omega = \frac{2\pi n}{T}.$$

The intensity at the detector is then $$I_1(\nu_1,\nu_2) \approx \frac{c^2 \tau}{\Delta t}(1-\epsilon^2)\frac{\kappa_1 \Delta \nu_1}{2} \cdot \qquad (33)$$

$$[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)]$$

$$= c^2 \cdot NSTEPS \cdot n(1-\epsilon^2)\frac{\kappa_1 \Delta \nu_1}{2} \cdot \qquad (34)$$

$$[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)].$$

For the source polarization controller 54 NSTEPS=954 and n=NCPC=1. For the loop polarization controller 156 NSTEPS=106 and n=NCPC=9. Then the servo loop gain for $\Delta \nu_2$ and $\epsilon$ both near zero is $$G_1 \approx \frac{X_1}{\{c^2\pi 954[J_1(\alpha_1)J_0(\alpha_2) + J_1(\alpha_1)J_2(\alpha_2) - J_3(\alpha_1)J_2(\alpha_2) - J_3(\alpha_1)J_4(\alpha_2)]\}} \qquad (35)$$

so that $\Delta \nu_1 = G_1 I_1$. Similar expressions apply for the quadrature channel so that $\Delta \nu_2 = G_2 I_2$.

Equation 35 is used to calculate the servo loop gain in a single board polarization control program. The program adds the quantities $\Delta \nu_1$ and $\Delta \nu_2$ to $\nu_{1off}$ and $\nu_{2off}$ in order to obtain the desired polarization state defined by ($\nu_{10}$, $\nu_{20}$). The updated offsets $\nu_{1off}$ and $\nu_{2off}$ are then output along with the modulation signal (Equations 19 and 20) to a pair of digital to analog converters (not shown). These digital to analog converters in turn apply voltages to the birefringence transducers. As the birefringence in the fiber changes with time, error signals are generated that quickly cause the polarization state to be returned to the optimal condition. The modulation frequencies used in the fiber optic rotation sensor may be 1 Hz for the source polarization controller 54 and 9 Hz for the loop polarization controller 156. The servo loop delay time of one second is sufficiently short to reliably track the slow drift in fiber birefringence.

The relative strengths of the polarization state modulation signals and the fiber optic rotation sensor non-reciprocal phase modulation signal are determined in part by the birefringence transducer modulation amplitudes $B_1$ and $B_2$ and the peak phase deviation of the non-reciprocal phase modulator. For the case of two modulated polarization controllers (four dimensions) the peak non-reciprocal phase shift sensitivity point corresponds to less that 10 percent amplitude reduction in the second harmonic of the fiber optic rotation sensor non reciprocal phase modulation frequency. The two dimensional case peak non-reciprocal phase shift sensitivity point results in a 46 percent amplitude reduction in the second harmonic signal. The modulation also impacts on the accuracy of the polarization controller error signal.

Application of the Invention to a Fiber Optic Coherent Communications System

Figures 5, 6:
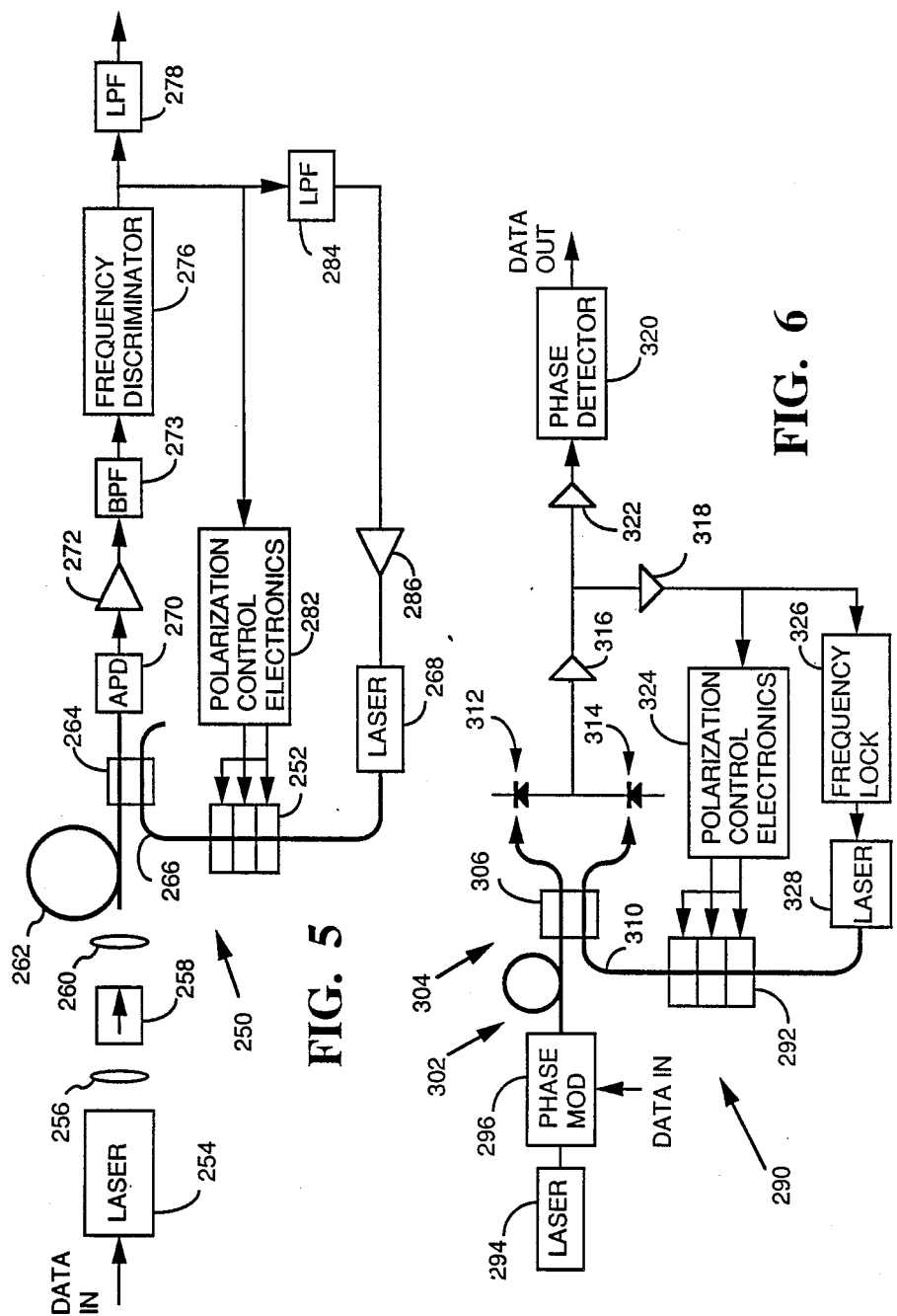
FIG. 5 illustrates a coherent optical fiber communications system that includes a single photodetector optical heterodyne receiver with active polarization control.
FIG. 6 illustrates a coherent optical fiber communications system that includes a balanced mixer, dual photodetector, optical heterodyne receiver with active polarization control.

FIG. 5 illustrates a fiber optic coherent optical communications system 250 that includes a polarization control system 252, which is preferably essentially identical with the polarization control servo system 20 of FIG. 1. A data signal is input to a discrete feedback laser 254, which produces an output beam containing the data. The output beam of the laser 254 is incident upon a lens 256, which directs the beam through an optical isolator system 258. The optical isolator system assures one-way propagation of light and directs the signal to a lens 260 that directs the data signal to an optical fiber 262. The optical fiber 262 is generally a single mode optical fiber and may have a length of about 100 km in a typical communications system. The signal in the optical fiber 262 impinges upon an optical coupler 264, which combines the signal in the fiber 262 with signals guided by an optical fiber 266.

The signals input to the optical fiber 266 originate in a laser 268, which may be an external grating laser. The output of the laser 268 is guided by the fiber 266 to the polarization control system 252. Polarization control is desirable in the communications system 250 because the signals in the fiber 266 are used to demodulate signals in the fiber 262. Therefore the optical signals in the fibers must interfere with one another in order to produce the mixing required for demodulation. The signals in the fibers 262 and 266 must have the same polarization to prevent signal fading.

The combined optical signals are incident upon a detector 270, which is preferably a Germanium avalanche photodiode. The output of the detector 270 is an electrical signal indicative of the interference pattern formed by mixing the data signal with the demodulation signal. The electrical signal is amplified by an amplifier 272, band pass filtered by a filter 273 and then input to a frequency discriminator 276. The output of the frequency discriminator 276 is input to a low pass filter 278 whose output is the data signal output of the communications system 250.

The output of the frequency discriminator 276 is input to a polarization control electronics circuit 282, which applies control signals to the polarization control system 252. The output of the frequency discriminator 276 is also input to a low pass filter 284 and then amplified by an amplifier 286. The output of the amplifier 286 is applied to the laser 268 to provide frequency stabilization thereto.

A difference in the optical carrier signals in the fibers 262 and 266 will cause the output of the detector 272 to be less than its maximum value. The output of the frequency discriminator 276 provided to the polarization control electronic circuit causes the polarization of the signal in the fiber 266 to be adjusted to match the polarization of the signal in the fiber 262 and bring the output of the photodetector 272 back to its maximum value.

Referring to FIG. 6, a communications system 290 includes a polarization controller 292 which is preferably substantially identical to the polarization controller 20 described above with reference to FIG. 1. A laser 294, which is preferably an extended cavity laser, provides a beam of light which passes through a phase modulator 296. An electronic oscillatory signal with data information imposed on it is applied to the phase modulator and imposes the carrier and data signals onto the transmitted light. The light beam then enters the fiber 302 which transmits the signals to the receiver 304. The receiver 304 includes an optical coupler 306 that combines the data and carrier signals with a demodulation signal carried by a fiber 310. The optical coupler 306 preferably has a coupling efficiency of 50% so that the portions of the fibers 302 and 310 on the right side of the coupler as viewed in FIG. 6 contain equal portions of both the data and modulating signals.

The beams carried by the fibers 302 and 310 are input to detectors 312 and 314, respectively. The outputs of the detectors 312 and 314 are connected together and then input to an amplifier 316. The output of the amplifier 316 is input to an amplifier 322 and then to a phase detector 320, which provides the data output signal of the receiver 304.

The output of the amplifier 316 is also input to an amplifier 322, which provides the amplified signals to a polarization control electronics circuit 324 and to a frequency locking circuit 326. The polarization control electronic circuit 324 may be substantially identical to the electronic circuit 28 of FIG. 1 for controlling the three fiber squeezers 34-36. The frequency locking circuit 326 provides a signal to a local oscillator extended cavity laser 328, which may be an extended cavity laser. Deviations in the polarization of the optical signal of the local oscillator 328 from that of the signal input to the optical coupler 306 produces an error signal that is used to drive the polarization controller 292, which then adjusts the polarization of the light from the fiber 310 to be the same as that of the light from the fiber 302 at the detectors 312 and 314.

The structures illustrated and described herein illustrate the principles of the present invention. Modifications to the illustrated embodiments may be made without departing from the spirit of the present invention. Therefore, the present invention includes the subject matter defined by the appended claims and all reasonable equivalents.

What is claimed is:

1. A system for controlling the polarization of light guided by an optical waveguide, comprising:
    means for controlling the birefringence of the optical waveguide comprising a first transducer and a second transducer arranged to act on the optical waveguide along parallel axes and a third transducer being on an axis that is placed between the parallel axes and angularly displaced by 45° therefrom;
    means for applying a first control signal to each of the first and second transducers;
    means for applying a second control signal to the third transducer, the first and second control signals being in time quadrature;
    means for forming and electrical signal indicative of the intensity of light guided by the optical waveguide;
    means for processing the electrical signal to form an error signal indicative of differences between the polarization state of light guided by the optical waveguide and a predetermined desired polarization state; and
    means for combining the error signal with the first and second control signals to minimize the different between the polarization state of light guided by the optical waveguide and the desired polarization state.

2. The system of claim 1 wherein each of the transducers comprises a piezoelectric fiber squeezer that adjusts the birefringence of the optical waveguide by means of the photoelastic effect.

3. The system of claim 1, further comprising a polarizer arranged to provide a reference polarization in the optical waveguide.

4. The system of claim 1, further comprising:
    a first oscillator for producing the first control signal;
    first means for amplifying the first control signal;
    a second oscillator for producing the second control signal;
    second means for amplifying the second control signal; and
    means for providing independent gain control for the first and second amplifying means.

5. The system of claim 1, further comprising a dual channel phase sensitive detector responsive to both in-phase and quadrature signals for demodulating the electrical signal indicative of the intensity of light guided by the optical waveguide.

6. A fiber optic rotation sensor, comprising:
    a length of optical fiber formed to include a sensing loop;
    means for introducing counterpropagating optical waves into the sensing loop;
    means for processing the counterpropagating optical waves to produce a signal indicative of rotation of the sensing loop; and
    means for processing the signal indicative of rotation of the sensing loop to control the polarization of the counterpropagating light waves.

7. The fiber optic rotation sensor of claim 6, further comprising:
    means for controlling the birefringence of the sensing loop comprising a first transducer and a second transducer arranged to act on the optical fiber along parallel axes and a third transducer being on an axis that is placed between the parallel axes and angularly displaced by 45° therefrom;
    means for applying a first control signal to each of the first and second transducers;
    means for applying a second control signal to the third transducer, the first and second control signals being in time quadrature;
    means for processing the signal indicative of rotation of the sensing loop to form an error signal indicative of differences between the polarization states of the counterpropagating waves; and
    means for combining the error signal with the first and second control signals to minimize the differences between the polarization states of the counterpropagating waves.

8. The system of claim 7 wherein each of the transducers comprises a piezoelectric fiber squeezer that adjusts the birefringence of the optical fiber.

9. The system of claim 7, further comprising a polarizer arranged to provide a reference polarization for the counterpropagating optical waves.

10. The system of claim 7, further comprising:
    a first oscillator for producing the first control signal;
    first means for amplifying the first control signal;
    a second oscillator for producing the second control signal;
    second means for amplifying the second control signal; and
    means for providing independent gain control for the first and second amplifying means.

11. The system of claim 7, further comprising a dual channel phase sensitive detector responsive to both in-phase and quadrature signals for demodulating the electrical signal indicative of the intensity of light guided by the means for introducing counterpropagating optical waves into the sensing loop.

12. The system of claim 7, further comprising a source polarization controller for controlling the polarization of light input to the sensing loop.

13. A coherent optical communications system, comprising:
- means for producing a first optical signal that includes an optical carrier signal with a data signal superimposed thereon;
- means for producing a second optical signal for demodulating the data signal;
- means for optically mixing the first and second optical signals; and
- means for processing the mixed optical signals to control the polarization of the second optical signal so that the first and second optical signals have the same polarization when they are mixed.

14. The coherent optical communications system of claim 13, further comprising:
- a first optical waveguiding means for guiding the first optical signal;
- a second optical waveguiding means for guiding the second optical signal;
- optical coupler means for combining the first and second optical signals;
- detector means for producing an electrical signal indicative of the intensity of the combined optical signals; and
- means for processing the electrical signal to produce an error signal indicative of differences between the polarization state of light guided by the first and second optical waveguiding means.

15. A method for controlling the polarization of light guided by an optical waveguide, comprising the steps of:
- controlling the birefringence of the optical waveguide by the steps of arranging a first transducer and a second transducer to act on the optical waveguide along parallel axes and placing a third transducer on an axis that is placed between the parallel axes and angularly displaced by 45° therefrom;
- applying a first control signal to each of the first and second transducers;
- applying a second control signal to the third transducer, the first and second control signals being in time quadrature;
- forming an electrical signal indicative of the intensity of light guided by the optical waveguide;
- processing the electrical signal to form an error signal indicative of differences between the polarization state of light guided by the optical waveguide and a predetermined desired polarization state; and
- combining the error signal with the first and second control signals to minimize the difference between the polarization state of light guided by the optical waveguide and the desired polarization state.

16. The method of claim 15 including the step of forming each of the transducers to comprise a piezoelectric fiber squeezer that adjusts the birefringence of the optical waveguide by means of the photoelastic effect.

17. The method of claim 15, further comprising the step of providing a reference polarization in the optical waveguide.

18. The method of claim 15, further comprising the steps of:
- producing the first control signal with a first oscillator;
- amplifying the first control signal;
- producing the second control signal with a first oscillator;
- amplifying the second control signal; and
- providing independent gain control for the first and second amplifying means.

19. The method of claim 15, further comprising the step of detecting the in-phase and quadrature signals with a dual channel phase sensitive detector responsive for demodulating the electrical signal indicative of the intensity of light guided by the optical waveguide.

20. A method for forming a rotation sensor, comprising the steps of:
- forming a length of optical fiber to include a sensing loop;
- introducing counterpropagating optical waves into the sensing loop;
- processing the counterpropagating optical waves to produce a signal indicative of rotation of the sensing loop; and
- processing the signal indicative of rotation of the sensing loop to control the polarization of the counterpropagating light waves.

21. The method of claim 20, further comprising the steps of:
- controlling the birefringence of the sensing loop comprising a first transducer and a second transducer arranged to act on the optical fiber along parallel axes and a third transducer being on an axis that is placed between the parallel axes and angularly displaced by 45° therefrom;
- applying a first control signal to each of the first and second transducers;
- applying a second control signal to the third transducer, the first and second control signals being in time quadrature;
- processing the signal indicative of rotation of the sensing loop to form an error signal indicative of differences between the polarization states of the counterpropagating waves; and
- combining the error signal with the first and second control signals to minimize the differences between the polarization states of the counterpropagating waves at the detector.

22. The method of claim 21 including the steps of forming each of the transducers to comprise a piezoelectric fiber squeezer that adjusts the birefringence of the optical fiber.

23. The method of claim 21, further comprising the step of providing a polarizer arranged as a reference polarization for the counterpropagating optical waves.

24. The method of claim 21, further comprising the steps of:
- producing the first control signal with a first oscillator;
- amplifying the first control signal;
- producing the second control signal with a first oscillator;
- amplifying the second control signal; and
- providing independent gain control for the first and second amplifying means.

25. The method of claim 21, further including the step of forming a dual channel phase sensitive detector responsive to both in-phase and quadrature signals for demodulating the electrical signal indicative of the intensity of light guided by the means for introducing counterpropagating optical waves into the sensing loop.

26. The system of claim 21, further comprising including the step of controlling the polarization of light input to the sensing loop with a source polarization controller.

27. A method for forming a coherent optical communications system, comprising:
  producing a first optical signal that includes an optical carrier signal with a data signal superimposed thereon;
  producing a second optical signal for demodulating the data signal;
  optically mixing the first and second optical signals; and
  processing the mixed optical signals to control the polarization of the second optical signal so that the first and second optical signals have the same polarization when they are mixed.

28. The method of claim 30, further comprising:
  guiding the first optical signal with a first optical waveguiding means;
  guiding the first optical signal with a second optical waveguiding means;
  combining the first and second optical signals with an optical coupler means;
  producing an electrical signal indicative of the intensity of the combined optical signals; and
  processing the electrical signal to produce an error signal indicative of differences between the polarization state of light guided by the first and second optical waveguiding means.

* * * * *